Aug. 7, 1951 R. E. ZENNER 2,563,445

MOUNT FOR MAGNETIC TRANSDUCING HEADS

Filed Jan. 7, 1949 4 Sheets-Sheet 1

INVENTOR.
Raymond Edward Zenner
BY
Moses, Nolte, Crews & Berry
ATTORNEYS

MOUNT FOR MAGNETIC TRANSDUCING HEADS

Filed Jan. 7, 1949 4 Sheets-Sheet 2

INVENTOR.
Raymond Edward Zenner
BY
Moses, Nolte, Crews & Berry
ATTORNEYS.

MOUNT FOR MAGNETIC TRANSDUCING HEADS

Filed Jan. 7, 1949 4 Sheets-Sheet 3

INVENTOR.
Raymond Edward Zenner
BY
Moses, Nolte, Crews & Berry
ATTORNEYS

Aug. 7, 1951 R. E. ZENNER 2,563,445

MOUNT FOR MAGNETIC TRANSDUCING HEADS

Filed Jan. 7, 1949 4 Sheets-Sheet 4

INVENTOR.
Raymond Edward Zenner
BY
Moses, Nolte, Crews & Berry
ATTORNEYS

Patented Aug. 7, 1951

2,563,445

UNITED STATES PATENT OFFICE 2,563,445

MOUNT FOR MAGNETIC TRANSDUCING HEADS

Raymond Edward Zenner, Hollywood, Ill., assignor to Nader Engineering Company, Chicago, Ill., a corporation of Illinois Application January 7, 1949, Serial No. 69,663

6 Claims. (Cl. 179—100.2)

This invention relates to magnetic recorders, and more particularly to the construction and arrangement of a recording and erasing head past which magnetizable tape is to be fed.

It is an object of the invention to provide a recording head which will be simple and inexpensive to manufacture, will yield a high quality of performance, will be highly efficient and practical in use, and will be durable in construction and stable in its operating characteristics.

To these ends it is a feature of the invention that a combined tape guide and hum shield is provided having a series of faces connected through rounded corners, and that the guide forming elements of the recording and erasing electromagnets have rounded faces which are located at the rounded corners of the shield and in flush relation to the outer face thereof.

It is a further feature of the invention that the recording and erasing heads as well as the shield are supported upon a common base and are positioned with relation to the base and to one another by engagement with jig formations simultaneously formed upon the base.

Other objects and advantages will hereinafter appear.

Referring to the drawing.

Figure 1:
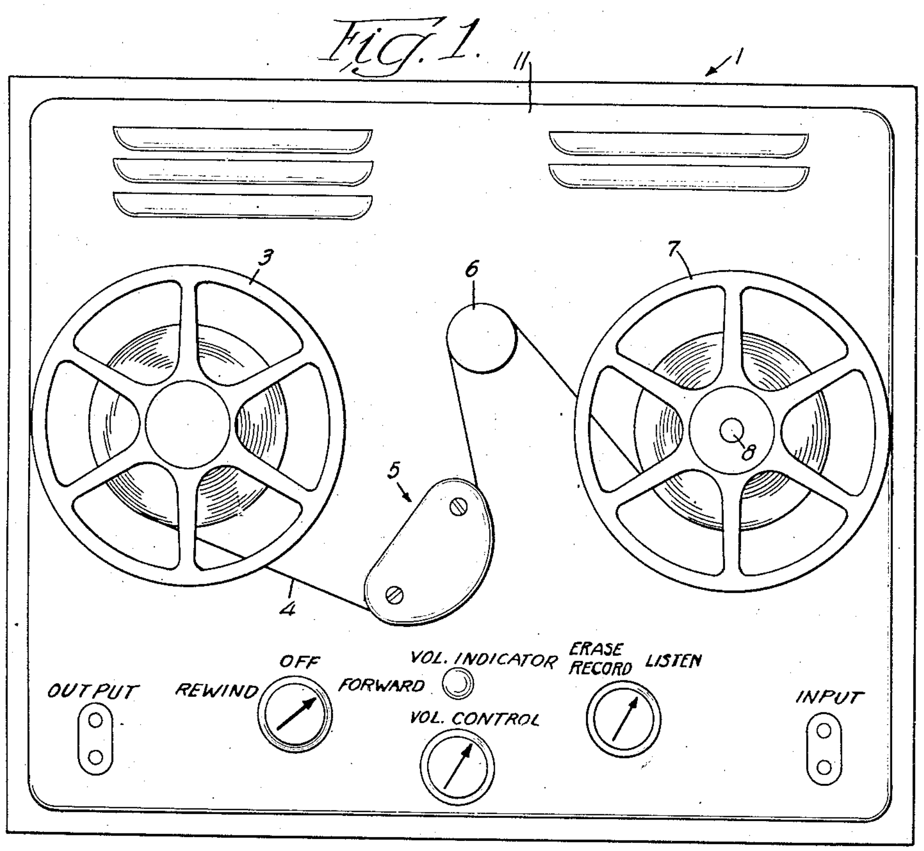
Fig. 1 is a plan view of an illustrative magnetic recorder which embodies features of the invention.
Figure 2:
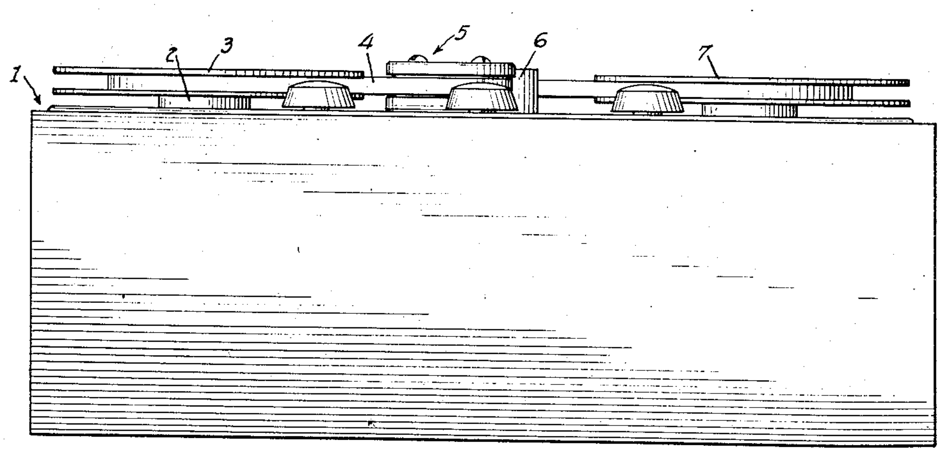
Fig. 2 is a view in front elevation of the recorder shown in Fig. 1.

The illustrative magnetic tape recorder comprises a casing 1 in which the major portion of the mechanical and electrical mechanism is housed. The present invention is not concerned with this casing nor the mechanism which it contains, and hence such mechanism may be passed over briefly. The casing carries a stationary post 2 upon which a tape supply spool 3 may be revolubly mounted. The tape 4 is led from the spool 3 around the front of a recording head 5, thence around the back of a capstan shaft 6 and onto a take-up spool 7. The capstan shaft 6 is driven at constant speed when the machine is running to draw the tape uniformly past erasing and recording gaps which are embodied in the mechanism of the recording head 5. The take-up spool 7 is adapted to be mounted upon a shaft 8, which is operated through a slip drive to rewind the tape after it has passed the capstan shaft 6. The speed of rotation of the slip drive is made high enough to assure that no slack will ever accumulate between the capstan shaft and the take-up reel.

The casing 1 carries various control knobs and indicators as well as input and output connections which are designated on the drawing by legends and which require no detailed description for the purpose of the present disclosure.

The recording head 5 comprises highly permeable upper and lower, flanged housing members 9 and 10 which, with suitable spacers interposed, are secured to one another and to the top plate 11 of the casing by means of bolts 12 and nuts 13. The housing members 9 and 10 carry conductive, non-magnetic lining sheets 14 and 15, which are desirably of brass. Upon the lining sheet 15 there is supported a base plate 16 upon which the recording, reproducing and erasing mechanisms are mounted. The base plate 16 is held in place by the same bolts 12 and nuts 13 which hold the housing members in assembled relation.

Before the base plate 16 can be associated with the housing members, however, the recording and reproducing assembly and the erasing assembly have to be put together and mounted upon it.

The recording and reproducing assembly comprises a block or bracket 17, desirably of brass. The block 17 is formed with a jig notch 18 for embracing a jig boss 19 formed on the base plate 16. The block is also formed with a threaded bore 20 for receiving a screw 21 by which the block is attached in predetermined position to the base plate 16. The jig boss 19 determines the exact orientation of the block with reference to the base plate 16, so that the location of the block relative to the base plate is precisely predetermined and maintained.

Figures 3, 4:
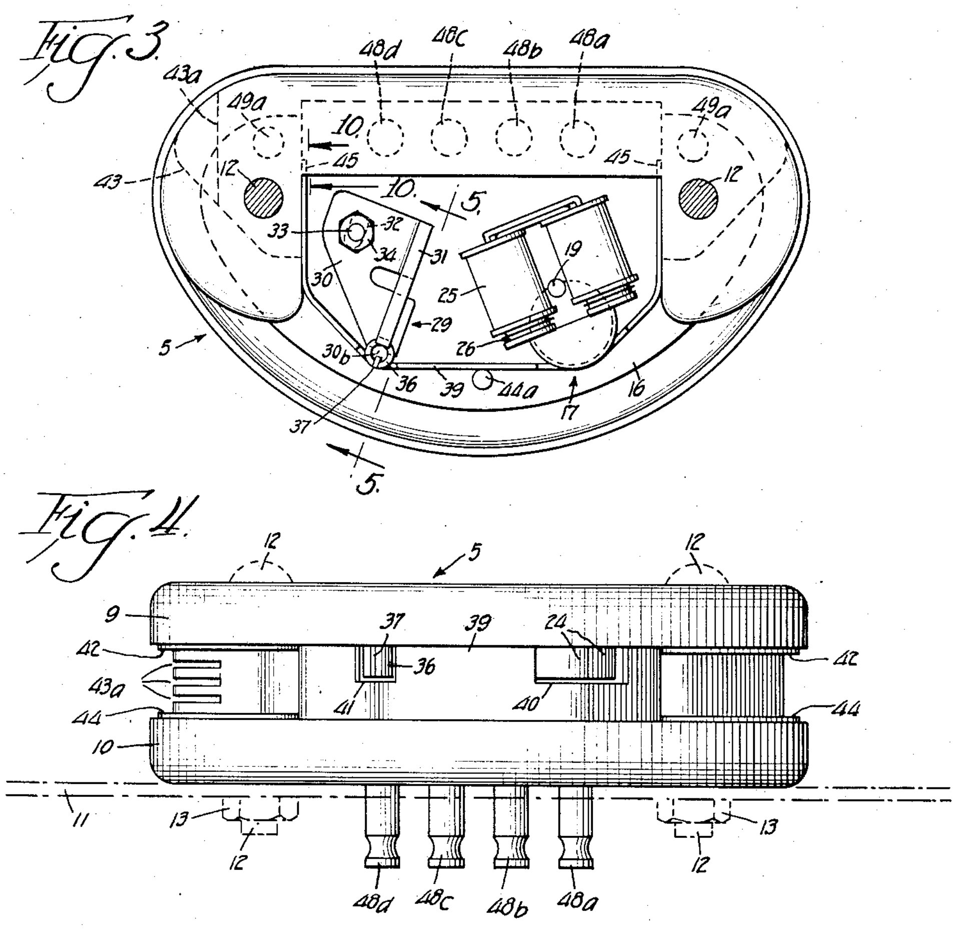
Fig. 3 is a plan view of the recording head with the upper housing member removed and the wax filler omitted, the view being upon a considerably larger scale than Figs. 1 and 2.
Fig. 4 is a view in front elevation of the recording head.
Figure 5:
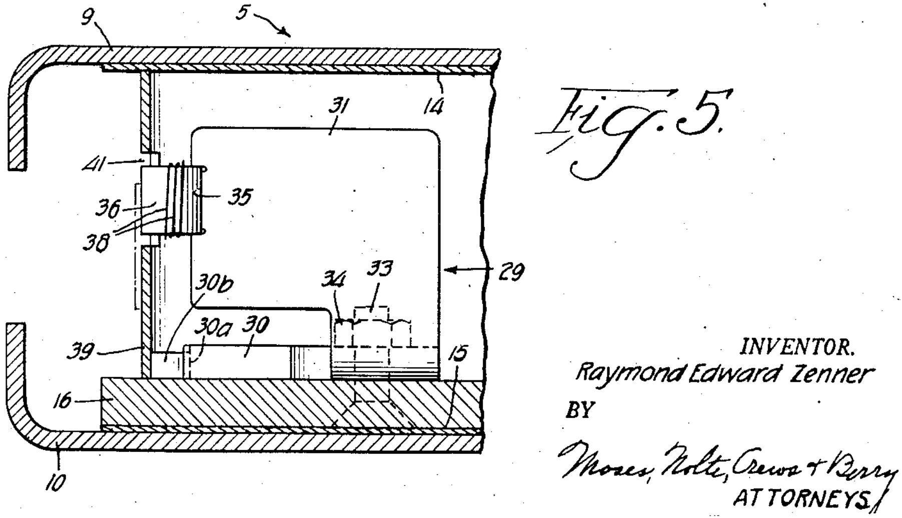
Fig. 5 is a fragmentary view in sectional elevation, taken upon the line 5—5 of Fig. 3 looking in the direction of the arrows, the wax filler being omitted, and the view being upon a larger scale than Figs. 3 and 4.
Figures 6, 7:
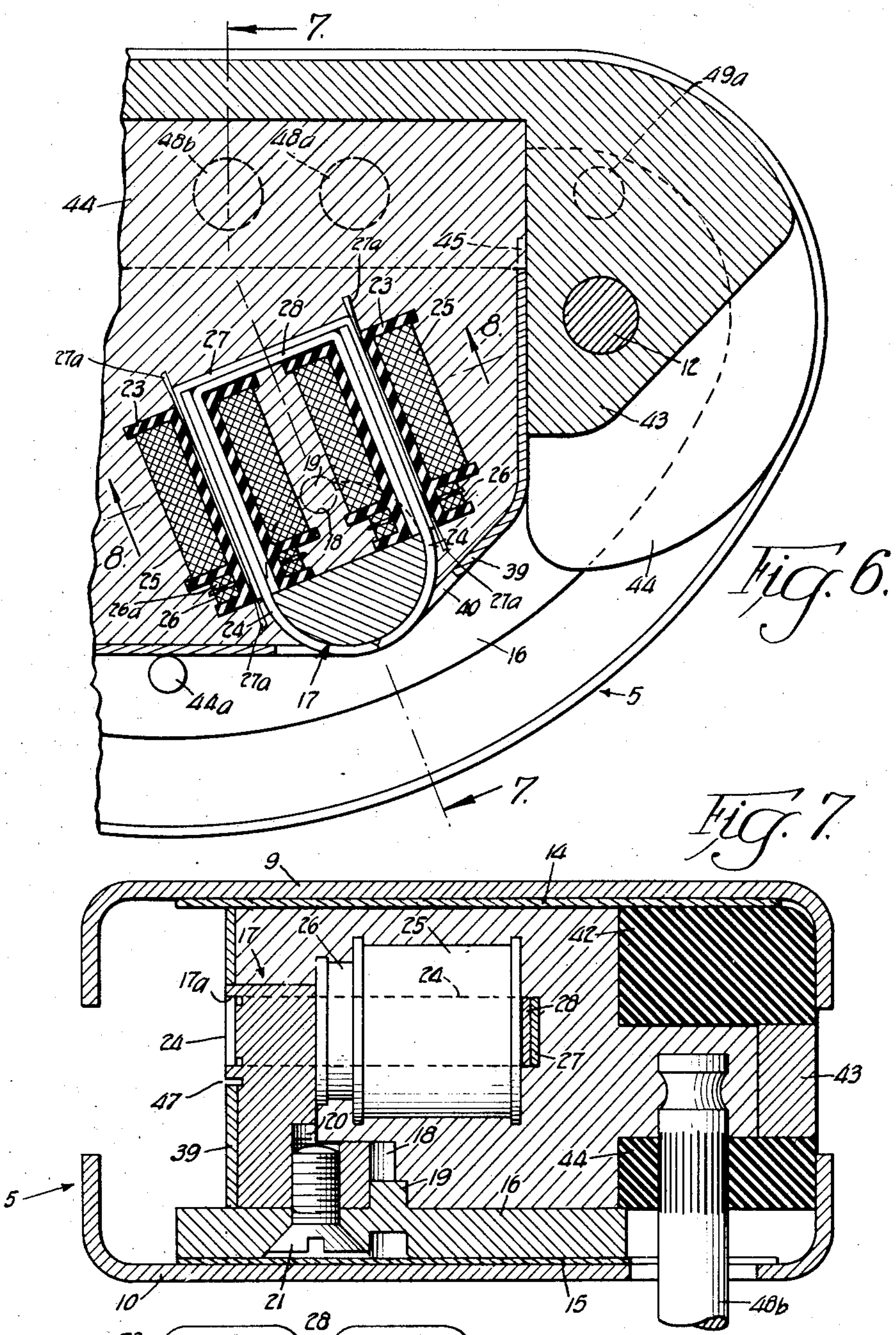
Fig. 6 is a fragmentary, horizontal, sectional view through the recording and playback end of the recording head.
Fig. 7 is a sectional view taken upon the line 7—7 of Fig. 6 looking in the direction of the arrows.
Figure 8:
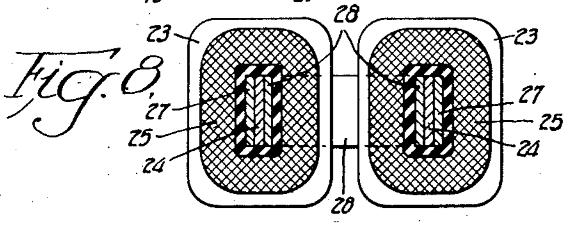
Fig. 8 is a sectional view taken upon the line 8—8 of Fig. 6 looking in the direction of the arrows.
Figure 9:
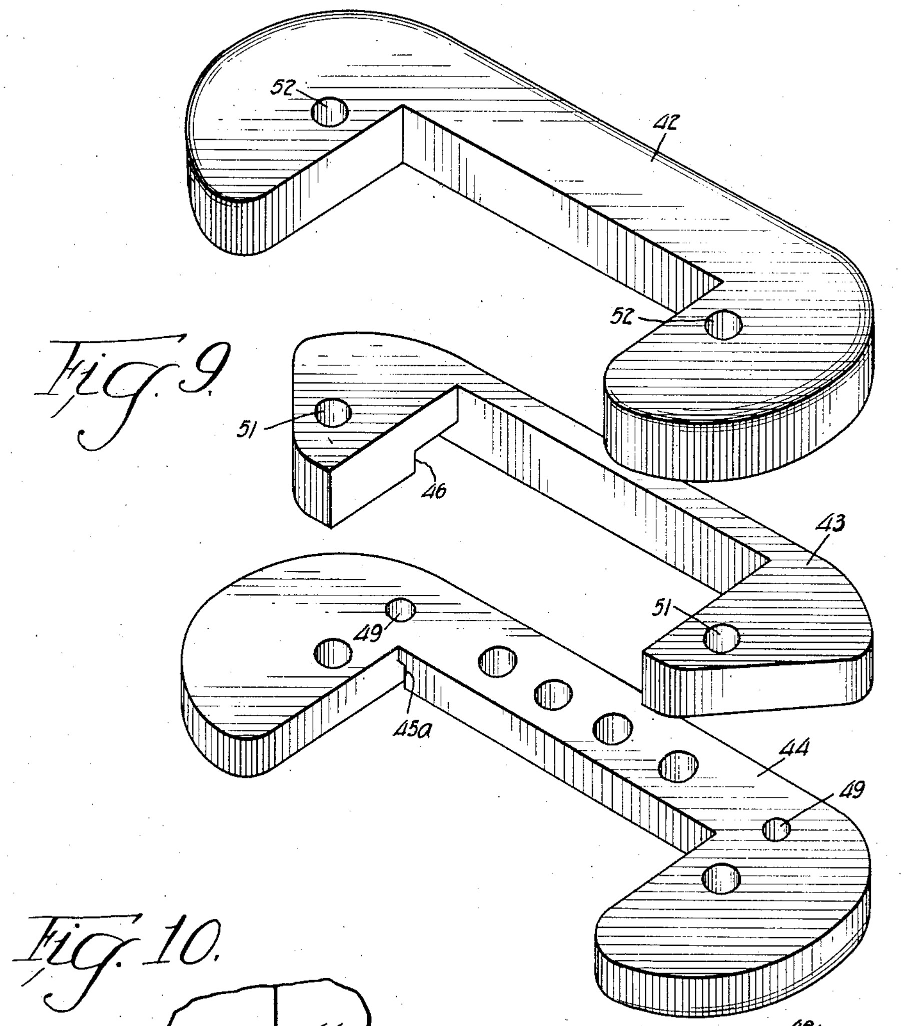
Fig. 9 is an exploded perspective view showing three spacer blocks which are employed at the rear between the upper and lower housing members of the recording head.
Figure 10:
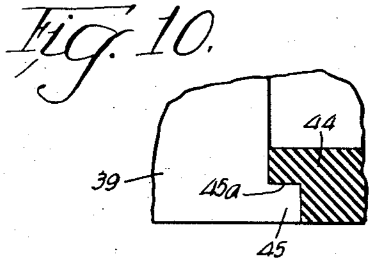
Fig. 10 is a fragmentary detail view showing how the channel keeper and hum shield is anchored in the notches of the lower spacer block.

The lower end of the block 17 desirably takes substantially the form of a notched cylinder, but the upper end of the block is cut away to form substantially a semi-cylinder. The record-playback unit 22 is mounted upon the block 17. It consists of two bobbins or coil forms 23 (Figs. 3, 6 and 7) made of any suitable insulating material, preferably molded nylon. These bobbins are mounted as follows:

Permeable J-shaped gap-forming, pole pieces 24 are first fitted to the block 17 in channels 17*a* formed in the block for the purpose, and are soldered to the block. The pole pieces include straight portions and curved portions. The edges of the curved portions continuously engage the side walls of the channel, and the concave faces of the curved portions desirably continuously engage the channel base. The soldering is done with the parts in a suitable jig which holds the pieces 17, 24, 24 in their proper relative positions, i. e., with the pieces 24, 24 continuously contacting the block 17 and extending from it with their straight portions in parallel relation to one another, and with the pieces 24, 24 contacting one another except for a thin film of solder previously applied to either one of them. The solder produces a gap between the ferromagnetic members 24, 24 of not less than .001 inch. The solder film prevents the formation of a zero gap.

Next the two coil forms 23 each wound with one coil 25, are slipped on the pieces 24, 24. Then comparatively large and small permeable, U-shaped, core pieces 27 and 28 are slipped into the positions illustrated in Fig. 6 with the legs of the larger piece extending outside the members 24, 24 and with the legs of the smaller piece extending inside of the members 24, 24. The members 27 and 28 are retained in place by small wooden wedges 27*a*, which may be fragments of toothpicks. The wedges are inserted between the member 27 and the coil forms 23.

The erase head assembly is next put together. This comprises a supporting bracket 29 which includes a horizontal attaching leg 30 and an upstanding, head supporting leg 31. The entire plate is initially flat, and the leg 31 is bent off at right-angles from the leg 30. The leg 30 is formed with a slot 32 through which the bracket is attached to the base plate 16 by means of a bolt 33 and a nut 34. The forward corner of the leg 30 is formed with a notch 30*a* to embrace a jig boss 30*b* formed on the base plate 16. The upstanding leg 31 has a notch 35 formed in its forward face. A ring 36 of ferromagnetic material is mounted in the notch and soldered to the leg 31. The ring 36 is formed with a magnetic gap, the edges of the gap being spaced from one another by a copper spacer 37. The ring 36 is located in exact axial alignment with the jig boss 34 of the base plate 16.

After the ring has been soldered in place, a winding 38 of about twenty turns is applied to the ring, and the same wire is then wound about the coil forms or spools 23 to form bias windings 26.

A combined channel keeper and hum shield 39 is provided. This member is desirably made of a sheet of Mumetal, a high nickel content steel alloy of very high permeability. The hum shield is generally U-shaped and is provided with windows 40 and 41 for receiving portions of the members 24, 24 which form the recording reproducing gap and for receiving the ring 36 which forms the erasing gap.

The hum shield 39 is generally U-shaped and has its upper edge engaged with spaced member 14 and its lower edge disposed to rest upon the base plate 16. The legs of the shield 39 extend in parallel relation toward the rear or flat face of the recording head. At the rear the legs extend between the side arms of three U-shaped spacers 42, 43 and 44. The shield is anchored at its ends by having ears 45 fitted into recesses 45*a* which are formed in the lower spacer 43.

The body of the shield includes three successive sides which are connected through rounded corners. The rounded corners extend flush with the rounded gap forming members of the erasing and recording heads. Between the heads the lower margin of the shield fits behind a jig boss 44*a* formed on the base plate 16. The bosses 18, 30*b* and 44*a* are formed at a single operation and desirably at the same operation at which the base plate is stamped and the screw holes are formed in the plate. Since the hum shield extends around the block 17 in a guide channel 47 formed in the block and since the spacers are accurately positioned with reference to the housing members and base block, the location of the hum shield is very accurately predetermined and maintained. The outer face of the shield is flush with the gap forming members of the recording electromagnet and the gap forming members of the erasing electromagnet.

The lower spacer 44, which is of a suitable insulating material such as Bakelite, carries a series of electrical terminal pins 48*a*, 48*b*, 48*c* and 48*d* which have a driven fit in the spacer, and which extend up into the space between the upper and lower spacers and down through the base plate 16, the lower housing member 10 and the casing cover 11, and into the casing 1. The spacer 44 is provided with openings 49 through which it is secured by rivets 49*a* to the base plate 16. Notches 46 are provided in the lower faces of spacer 43 to accommodate the heads of the rivets 49*a*. The lower spacer 44 is also provided with openings 50 through which the bolts 12 are passed for securing the head parts in assembled relation.

The intermediate spacer 43 which is a die casting of metal is provided with passages 51 for the bolts 12. The left hand end of the spacer 43 as viewed in Figs. 3 and 4 has a face which is substantially coplanar with one of the faces of the hum shield 39. The tape runs in engagement with this face. In order to reduce friction and avoid a suction effect, the left end of the spacer 43 is formed with a series of saw cuts 43*a*. This reduces considerably the drag upon the tape.

The upper spacer 42, of a suitable insulating material such as Bakelite, is provided with passages 52 for the bolts 12. When the parts have been clamped together in assembled relation by means of the bolts 12 and the nuts 13, the relationship of the upper and lower housing members 9 and 10 to the recording-reproducing head and to the erasing head is very accurately determined. The confronting edges of the spacers 42 and 44 stand spaced from one another by a distance just equal to the width of the tape 53 and serve to guide the tape past these heads with a zone constituting somewhat less than the upper half of the tape in position to travel across the heads in contact with them. The remaining width of the tape, constituting at least half of the entire width, travels past the heads in engagement with the hum shield.

The bolts 12 also pass through the spacers 14 and 15. These spacers are desirably formed of brass. The flanged housing members 9 and 10 are made of highly permeable material to prevent stray magnetic effects from reaching the recording electromagnet. These shields are made more effective by the brass sheets or spacers 14 and 15, which provide a laminar effect and thereby increase the efficiency of the magnetic shielding. The spacers 42, 43 and 44 form a wall which cooperate with the hum shield 39 and the base plate 16 to define a well which is closed at the sides and bottom. When the parts, with the exception of the housing member 9 and the spacer 14 have been assembled and the wiring connections have been completed, the well is filled or substantially filled with a molten thermoplastic material such as a suitable wax or pitch. The wax, for example, submerges all the parts contained in the well, protecting them against exposure to moisture. When the wax has solidified it performs a vibration damping function. The tape tends to act like a violin bow, setting up vibrations in the parts against which it rubs. It is these vibrations that are damped by the wax.

Figure 12:
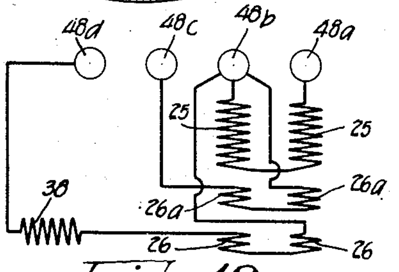
Fig. 12 is an electrical diagram showing the recording, reproducing and erasing coils, and the wire connections to them.
Figure 11:
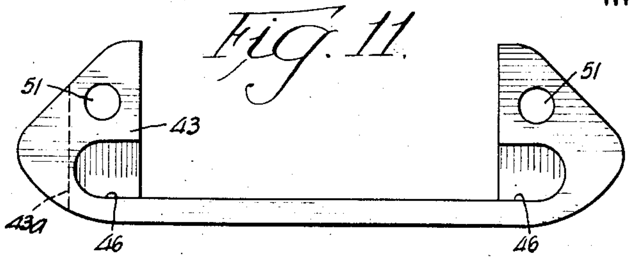
Fig. 11 is an inverted plan view of the intermediate spacer block showing the notched formation.

In Fig. 12 the connections of the coils to the terminal posts and their relations to one another are diagrammatically shown.

The erase coil 38 and the biasing coils 26 are connected in series with one another between the terminal posts 48*b* and 48*d*. The recording coils 25 are connected in series with one another between the terminal posts 48*a* and 48*b*. Reproducing coils 26*a* are connected in series with one another between terminal posts 48*b* and 48*c*.

When the tape has been fed completely through the machine from the reel 3 onto the reel 7, the reels with the tape still attached may be removed, turned over and interchanged to feed the tape in the same direction as before from the reel 7 onto the reel 3. Since this inverts the tape, what was formerly the lower margin of the tape is now the upper margin and is caused to travel past the heads in position to be acted upon by them.

I have described what I believe to be the best embodiments of my invention. I do not wish, however, to be confined to the embodiments shown, but what I desire to cover by Letters Patent is set forth in the appended claims.

I claim:

1. In a magnetic tape recorder, the combination with recording and erasing heads of a base plate, head supporting brackets for the respective heads mounted in spaced, predetermined positions upon the base plate, said heads including rounded gap forming members constituting tape contacting surfaces, a sheet metal hum shield having a series of sides connected through rounded corners around which the tape is drawn, and securing means for holding the hum shield in predetermined relation to the brackets, the hum shield having cut-outs of the rounded corners, and means whereby the heads are mounted on the brackets with the tape contacting surfaces exposed through the cut-outs in such manner that the said surfaces are flush with the remaining portions of said corners.

2. In a magnetic tape recorder, the combination with recording and erasing heads having tape contacting surfaces, of a base plate, brackets mounted on the base plate and supporting the respective heads, said brackets and base plate being formed with cooperating jig formations for locating the brackets upon the base plate in their assigned positions, a highly permeable sheet metal hum shield against which the tape is drawn as it travels past the erasing and recording heads, and means securing the hum shield upon the base plate in position to guide the tape to, partly around and away from the heads one after the other, the hum shield having cut-outs through which the heads are exposed to contact with the tape.

3. In a magnetic tape recorder, the combination with recording and erasing heads having tape contacting surfaces, of a base plate, brackets mounted on the base plate and supporting the respective heads, said brackets and base plate being formed with cooperating jig formations for locating the brackets in their assigned positions upon the base plate, a highly permeable sheet metal hum shield against which the tape is drawn as it travels past the erasing and recording heads, said shield being secured upon the base plate in position to guide the tape to, partly around and away from said heads one after the other, and upper and lower blocks supported from the base plate in positions to stand across the path of the tape as it approaches the erasing head and as it leaves the recording head, and formed with spaced confronting faces which serve as edge guides for the tape, the hum shield having cut-outs confined to a definite tape zone between said confronting block faces, through which the respective heads extend for contact with the tape, so that a desired portion of the tape width may contact the active head elements, while the remainder of the tape width is protected by the hum shield against undesired magnetic effects.

4. In a magnetic recorder tape, the combination with recording and erasing heads having tape contacting surfaces, of a base plate, brackets supporting the respective heads and mounted on the base plate, said brackets and base plate being formed with cooperating jig formations for locating the brackets in their assigned positions, a highly permeable sheet metal hum shield aginst which the tape is drawn as it travels past the erasing and recording heads, said shield being secured in predetermined relation to the base plate and said heads and having cut-outs through which the heads are exposed to act upon the tape, and upper and lower blocks supported from the base plate in positions to stand across the path of the tape as it approaches the erasing head and as it leaves the recording head, and formed with spaced confronting faces which serve as edge guides for the tape, the tape engaging faces of the blocks being located at such heights in relation to the hum shield cut-outs that the tape is caused to travel past the heads with a tape zone extending from one edge at least to the longitudinal center line in engagement with said shield.

5. In a magnetic tape recorder, the combination with a base plate, of recording and erasing heads having tape contacting surfaces, supporting brackets mounted on the base plate and supporting the respective heads, said brackets and base plate being located in predetermined relation to one another, a highly permeable sheet metal hum shield against which the tape is drawn as it travels past the erasing and recording heads, the hum shield being positioned in a predetermined relation to the base plate and said heads and having cut-outs through which the heads are exposed to act upon the tape, a wall cooperative with the base plate and the hum shield to define a well within which the recording and erasing heads are located, and a body of solidified, moisture-excluding, vibration damping, thermoplastic material substantially filling the well and submerging the recording and erasing heads.

6. In a magnetic tape recorder, the combination with recording and erasing heads having tape contacting surfaces, of a base plate, head brackets supporting the respective heads and secured upon the base plate, upper and lower housing members of highly permeable material extending above and below the heads to protect them against stray magnetic effects, said members formed with confronting flanges which are spaced from one another by only a little more than the width of the tape, and conductive, non-magnetic sheets extensively engaging the inner faces of the upper and lower housing members to provide a laminar structure for enhancing the shielding effect of said upper and lower housing members.

RAYMOND EDWARD ZENNER.

REFERENCES CITED

The following references are of record in the file of this patent:

UNITED STATES PATENTS

| Number | Name | Date |
|---|---|---|
| 2,144,844 | Hickman | Jan. 24, 1939 |
| 2,277,305 | Clopton | Mar. 24, 1942 |
| 2,413,108 | Latchford | Dec. 24, 1946 |
| 2,426,838 | Miller | Sept. 21, 1947 |

FOREIGN PATENTS

| Number | Country | Date |
|---|---|---|
| 429,987 | Great Britain | June 11, 1935 |